United States Patent
Zhu et al.

(10) Patent No.: US 12,470,670 B2
(45) Date of Patent: Nov. 11, 2025

(54) SYSTEMS AND METHODS FOR ENHANCING AUDIO FOR A VIDEO CONFERENCING APPLICATION

(71) Applicant: Verizon Patent and Licensing Inc., Basking Ridge, NJ (US)

(72) Inventors: Lily Zhu, Parsippany, NJ (US); Rohit Sonalkar, Danville, CA (US); Alagu Periyannan, Palo Alto, CA (US); Timothy M. Dwight, Richardson, TX (US); Brian T. Mecum, Aliso Diejo, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 419 days.

(21) Appl. No.: 17/934,879

(22) Filed: Sep. 23, 2022

(65) Prior Publication Data
US 2024/0106978 A1 Mar. 28, 2024

(51) Int. Cl.
*H04N 7/15* (2006.01)
*H04L 12/18* (2006.01)
*H04N 7/14* (2006.01)

(52) U.S. Cl.
CPC ......... *H04N 7/152* (2013.01); *H04L 12/1818* (2013.01); *H04L 12/1827* (2013.01); *H04N 7/147* (2013.01)

(58) Field of Classification Search
CPC ............................ H04N 7/152; H04L 12/1818
See application file for complete search history.

(56) References Cited

U.S. PATENT DOCUMENTS

2005/0278195 A1* 12/2005 Getz ...................... G06Q 10/10
705/2
2013/0294321 A1* 11/2013 Wang .................... H04W 28/16
370/312

* cited by examiner

*Primary Examiner* — Amal S Zenati

(57) ABSTRACT

A network device may receive a request for functionality to switch to wideband audio at a user device receiving over-the-top (OTT) video and OTT audio associated with a video conferencing application provided by an application server. The network device may switch from the OTT audio to the wideband audio, for the video conferencing application, based on receiving the request for the functionality. The network device may provide the wideband audio associated with the video conferencing application to the user device to cause the user device to provide the OTT video and the wideband audio independently.

20 Claims, 8 Drawing Sheets

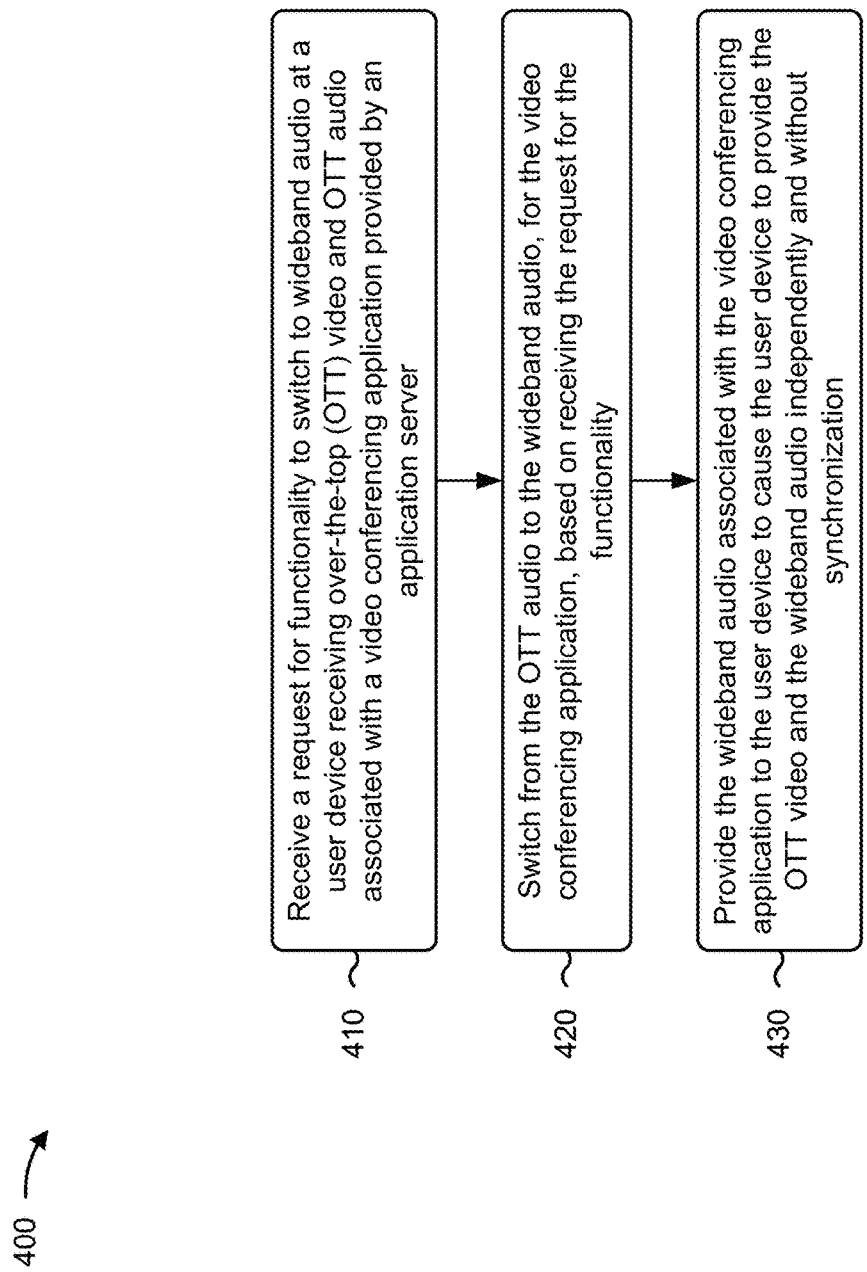

SYSTEMS AND METHODS FOR ENHANCING AUDIO FOR A VIDEO CONFERENCING APPLICATION

BACKGROUND

A user device (e.g., a mobile telephone, a tablet computer, a desktop computer and/or the like) may utilize a video conferencing application based on connecting with a network.

BRIEF DESCRIPTION OF THE DRAWINGS

FIG. 4 is a flowchart of an example process for enhancing audio for a video conferencing application.

DETAILED DESCRIPTION OF EXAMPLE EMBODIMENTS

Figure 1A:
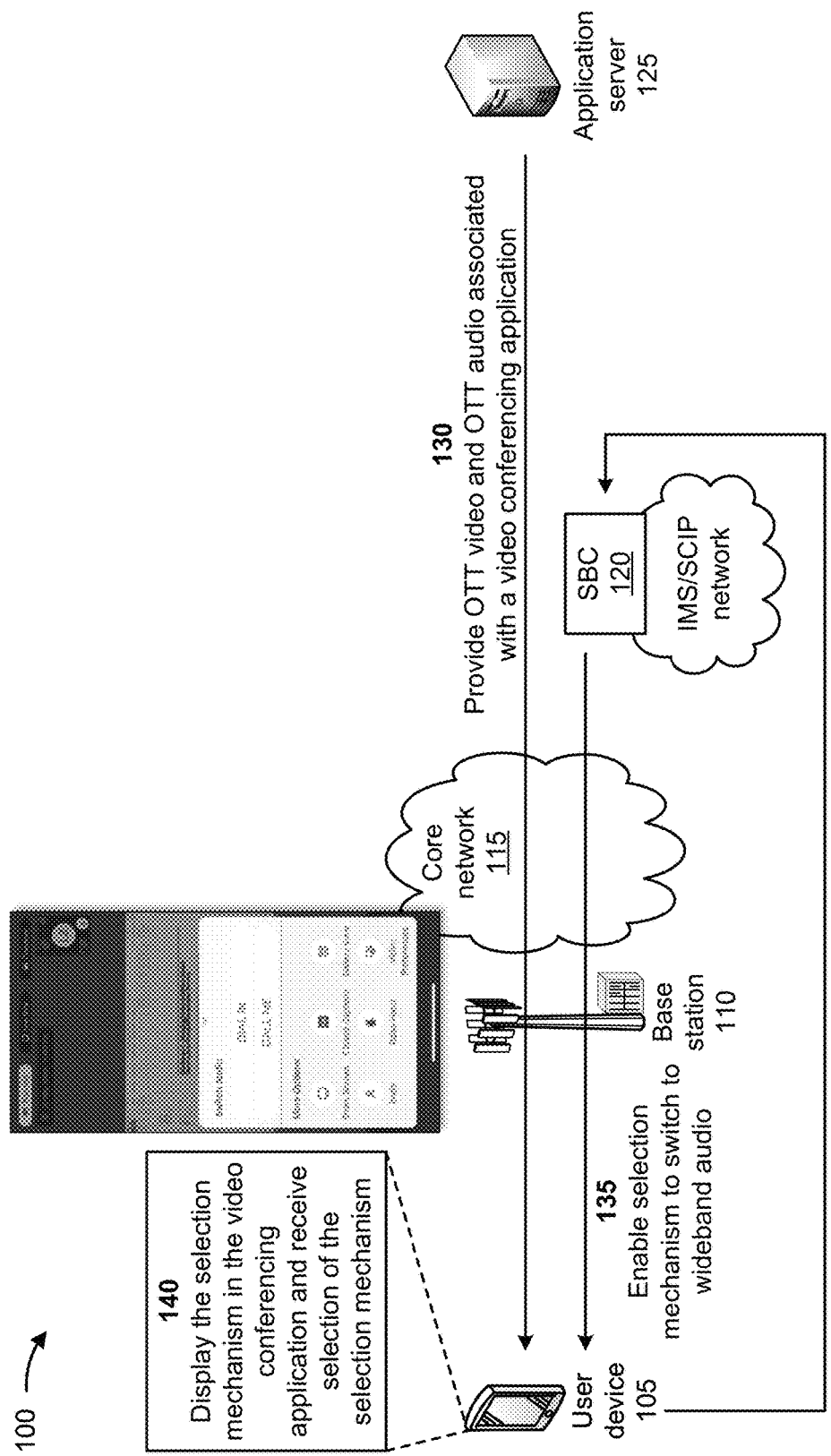
FIGS. 1A-1E are diagrams of an example associated with enhancing audio for a video conferencing application.

The following detailed description of example implementations refers to the accompanying drawings. The same reference numbers in different drawings may identify the same or similar elements.

A video conferencing application may provide two-way or multipoint reception and transmission of audio and video signals by user devices in various locations for real time communication. The video conferencing application may be provided by a network to the user devices via over-the-top (OTT) best-effort delivery communications. However, during times of network congestion, audio for the video conferencing application may experience packet loss, packet drop, and jitter, video for the video conferencing application may experience lower video resolution, additional retransmissions, and lower bit rates, and content for the video conferencing application may experience lower content resolution and lower bit rates. The degradation in the audio, the video, and the content for the video conferencing application may impact a user experience with degraded audio, blurry and low frame rate video, loss of video, blurry content, content delays, and/or the like. Thus, current mechanisms for providing a video conferencing application consume computing resources (e.g., processing resources, memory resources, communication resources, and/or the like), networking resources, and/or other resources associated with failing to provide quality audio to user devices, resulting in a poor user experience, losing or dropping packets associated with the audio, failing to provide a good user experience for the video and/or the content, handling complaints from users associated with the user devices, and/or the like.

Some implementations described herein provide a network device that enhances audio for a video conferencing application. For example, the network device may receive a request for functionality to switch to wideband audio at a user device receiving OTT video and OTT audio associated with a video conferencing application provided by an application server. The network device may switch from the OTT audio to the wideband audio, for the video conferencing application, based on receiving the request for the functionality. The network device may provide the wideband audio associated with the video conferencing application to the user device to cause the user device to provide the OTT video and the wideband audio independently and without synchronization.

In this way, the network device enhances audio for a video conferencing application. For example, the network device may enable a user device to easily switch audio for a video conferencing application from OTT best-effort delivery to wideband, high priority delivery (e.g., voice-over-long-term evolution (VoLTE) delivery). The network device may enable end-to-end wideband encoding/decoding (that encodes or decodes a data stream or signal), which improves audio fidelity (e.g., richer voice data) and eliminates a need for transcoding. Thus, the network device may conserve computing resources, networking resources, and/or other resources that would otherwise have been consumed by failing to provide quality audio to user devices, resulting in a poor user experience, losing or dropping packets associated with the audio, failing to provide a good user experience for the video and/or the content, handling complaints from users associated with the user devices, and/or the like.

FIGS. 1A-1E are diagrams of an example 100 associated with enhancing audio for a video conferencing application. As shown in FIG. 1A, the example 100 may include a user device 105, a base station 110, a core network 115, an Internet protocol (IP) multimedia subsystem (IMS)/session-initiated-protocol (SIP) carrier interconnect platform (SCIP) network, a session border controller (SBC) 120, and an application server 125. Further details of the user device 105, the base station 110, the core network 115, the IMS/SCIP network, the SBC 120, and the application server 125 are provided elsewhere herein.

As shown in FIG. 1A, and by reference number 130, the application server 125 may provide OTT video and OTT audio associated with a video conferencing application to the user device 105. For example, the user device 105 may execute a video conferencing application of the user device 105, and the video conferencing application may cause the user device 105 to communicate with the application server 125 that provides the video conferencing application. In some implementations, the user device 105 may utilize the video conferencing application to establish a video conferencing meeting with one or more other user devices 105 also executing the video conferencing application. During the video conferencing meeting, the application server 125 may communicate OTT audio, video, and/or content, associated with the video conferencing meeting, with the user device 105. For example, the application server 125 may provide, to the user device 105, OTT video and OTT audio associated with the video conferencing application, and the user device 105 may receive the OTT video and the OTT audio. The term "video," as used herein, may include video and content associated with the video conferencing application.

As further shown in FIG. 1A, and by reference number 135, the SBC 120 may enable a selection mechanism to switch to wideband audio at the user device 105. For example, the SBC 120 may enable functionality to switch from the OTT audio to the wideband audio at the user device 105 receiving the OTT video and the OTT audio associated with the video conferencing application provided by the application server 125. In some implementations, the wideband audio may include VoLTE audio, voice-over-new radio (VoNR), and/or the like. In some implementations, the OTT audio may be associated with a quality of service (QoS) class identifier (QCI) of eight or nine, and the wideband audio may be associated with a QCI of one or five. In some implementations, the functionality to switch from the OTT audio to the wideband audio at the user device 105 may enable the user device 105 to display a selection mechanism (e.g., a button, a link, an icon, and/or the like) in the video conferencing application. The selection mechanism, when selected, may enable the user device 105 and/or the application server 125 to switch from the OTT audio to the wideband audio.

As further shown in FIG. 1A, and by reference number 140, the user device 105 may display the selection mechanism in the video conferencing application and may receive selection of the selection mechanism. For example, the functionality to switch from the OTT audio to the wideband audio at the user device 105 may cause the user device 105 to display the selection mechanism in the video conferencing application. The selection mechanism, when selected, may enable the functionality to switch from the OTT audio to the wideband audio and may cause the user device 105 to generate a request for the functionality. In some implementations, the user device 105 may display a "dial in" button and a "call me" button to a user of the user device 105. The user of the user device 105 may select the selection mechanism (e.g., one of the "dial in" button or the "call me" button), and the user device 105 may receive the selection of the selection mechanism (e.g., selection of the "dial in" button or the "call me" button). The "dial in" button, when selected, may cause the user device 105 to establish a wideband audio path (e.g., a call) with the application server 125, via a particular telephone number associated with the SBC 120. The "call me" button, when selected, may cause the application server 125 to establish a wideband audio path (e.g., a call) with the user device 105, via the particular telephone number associated with the SBC 120.

As further shown in FIG. 1A, and by reference number 145, the SBC 120 may receive the selection of the selection mechanism from the user device 105. For example, the SBC 120 may receive a request for the functionality to switch from the OTT audio to the wideband audio from the user device 105 or the application server 125. The request may include the call to the particular telephone number associated with the SBC 120. In some implementations, when the "dial in" button is selected by the user, the user device 105 may utilize the particular telephone number or particular identification information to provide the call to the SBC 120, and the SBC 120 may receive the call from the user device 105. Alternatively, when the "call me" button is selected by the user of the user device 105, the application server 125 may utilize the particular identification information, e.g., the particular telephone number, to provide the call to the SBC 120, and the SBC 120 may receive the call from the application server 125.

Figure 1B:
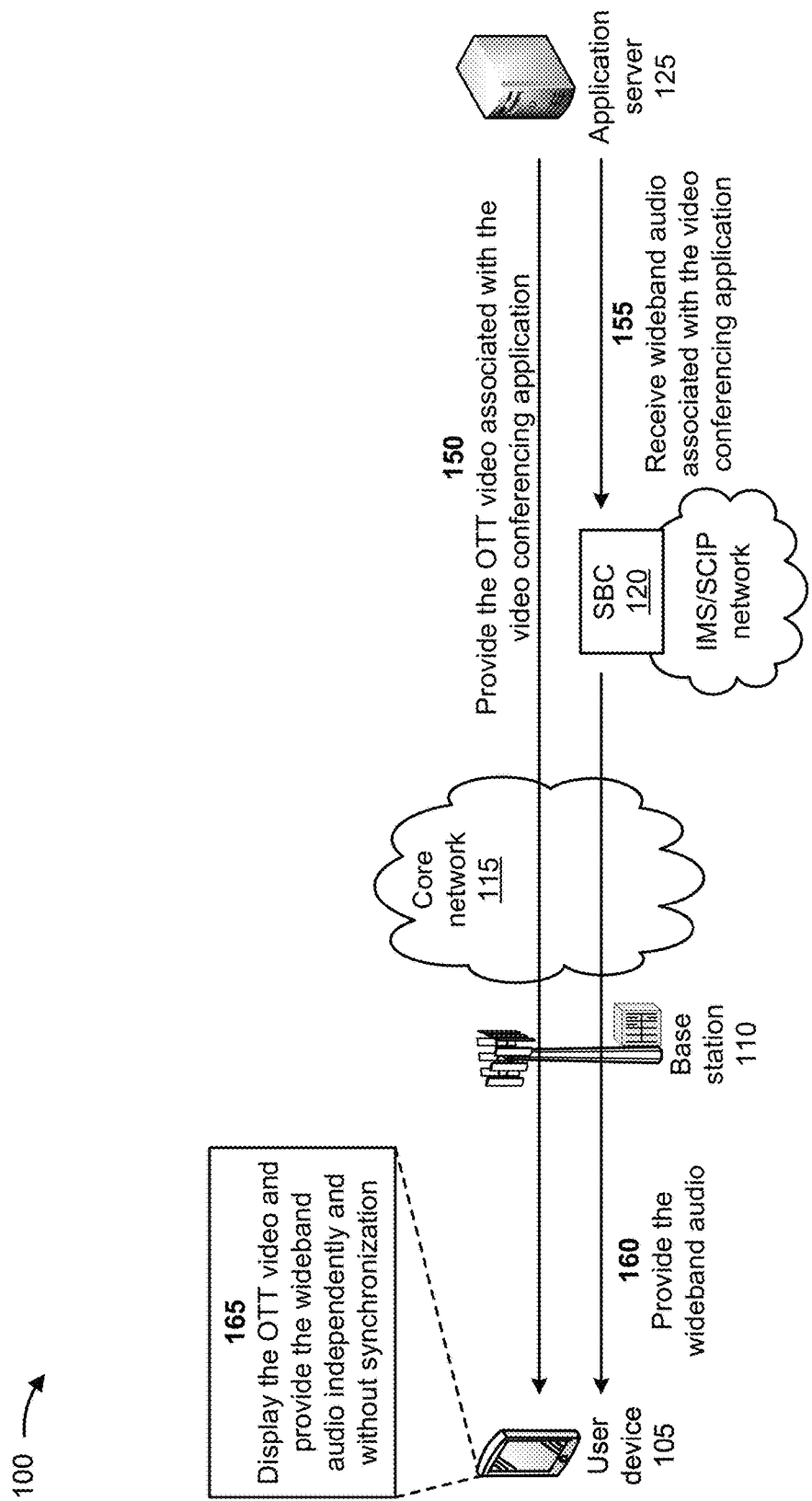

As shown in FIG. 1B, and by reference number 150, the application server 125 may provide the OTT video associated with the video conferencing application to the user device 105. For example, the application server 125 may continue to provide, to the user device 105, the OTT video associated with the video conferencing meeting provided by the video conferencing application, even after receipt of the request for the functionality to switch from the OTT audio to the wideband audio (e.g., the selection of the selection mechanism).

As further shown in FIG. 1B, and by reference number 155, the SBC 120 may receive wideband audio associated with the video conferencing application from the application server 125. For example, based on receiving the request for the functionality to switch from the OTT audio to the wideband audio (e.g., via the call to the particular telephone number), the SBC 120 may receive the wideband audio associated with the video conferencing application from the application server 125. In some implementations, the wideband audio may include high fidelity audio that does not require transcoding by the SBC 120.

As further shown in FIG. 1B, and by reference number 160, the SBC 120 may provide the wideband audio associated with the video conferencing application to the user device 105. For example, the SBC 120 may provide the wideband audio associated with the video conferencing application to the user device 105, via the base station 110 and the core network 115. In some implementations, the SBC 120 need not synchronize the wideband audio with the OTT video prior to providing the wideband audio to the user device 105.

As further shown in FIG. 1B, and by reference number 165, the user device 105 may display the OTT video and may provide the wideband audio independently and without synchronization. For example, the user device 105 may receive and display (e.g., to the user) the OTT video associated with the video conferencing application. The user device 105 may receive and provide (e.g., to the user) the wideband audio, associated with the video conferencing application, independently of the OTT video and without synchronization with the OTT video.

Figure 1C:
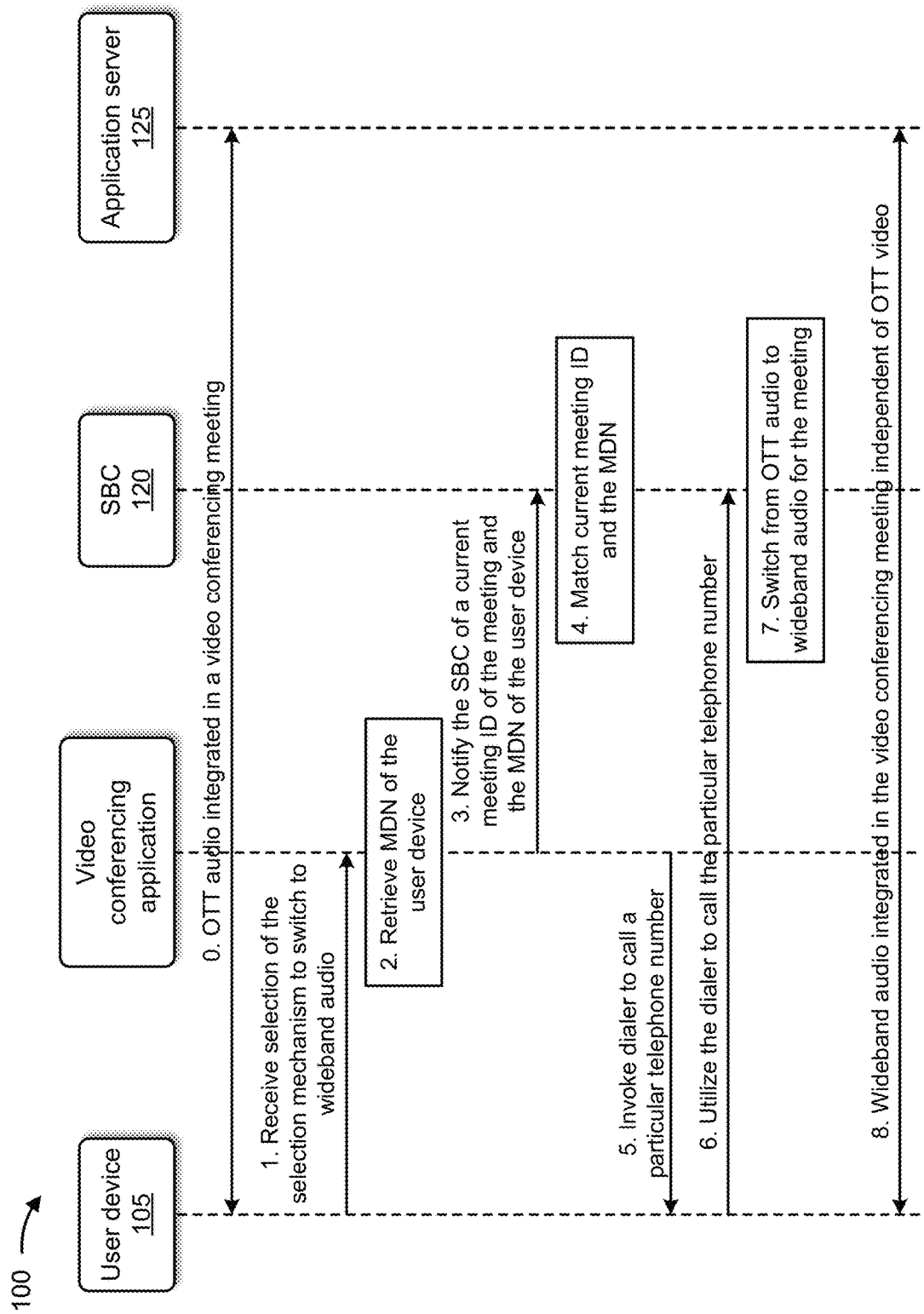

FIG. 1C is a call flow diagram depicting implementations described herein. As shown at step 0 of FIG. 1C, the user device 105 may communicate with the application server 125 to send and/or receive OTT audio (e.g., and OTT video and/or OTT content) integrated in a video conferencing meeting. As shown at step 1, a user of the user device 105 may select a selection mechanism to switch the OTT audio to wideband audio, and the video conferencing application of the user device 105 may receive the selection of the selection mechanism. As shown at step 2, the video conferencing application may retrieve a network identifier (e.g., a mobile directory number (MDN)) associated with the user device 105.

As shown at step 3 of FIG. 1C, the video conferencing application may notify (e.g., via a notification message provided by the user device 105) the SBC 120 of a current meeting identifier (ID) of the video conferencing meeting and the network identifier (e.g., the MDN) of the user device 105. The SBC 120 may receive the notification message from the video conferencing application. As shown at step 4, the SBC 120 may match the current meeting ID and the network identifier (e.g., the MDN) of the user device 105 so that the SBC 120 may associate the video conference meeting with the user device 105. As shown at step 5, the video conferencing application may invoke a dialer (e.g., a telephone application) of the user device 105 to call a particular telephone number associated with the SBC 120. As shown at step 6, the user device 105 may receive the invocation from the video conferencing application, and may utilize the dialer to call the particular telephone number based on the invocation. The SBC 120 may receive the call to the particular telephone number.

As shown at step 7 of FIG. 1C, based on receiving the call, the SBC 120 may switch from the OTT audio to the wideband audio for the video conferencing meeting. As shown at step 8, the user device 105 may communicate with the application server 125 to send and/or receive wideband audio, integrated in the video conferencing meeting, independent of the OTT video and/or the OTT content and without synchronization of the wideband audio, the OTT video, and the OTT content.

Figure 1D:
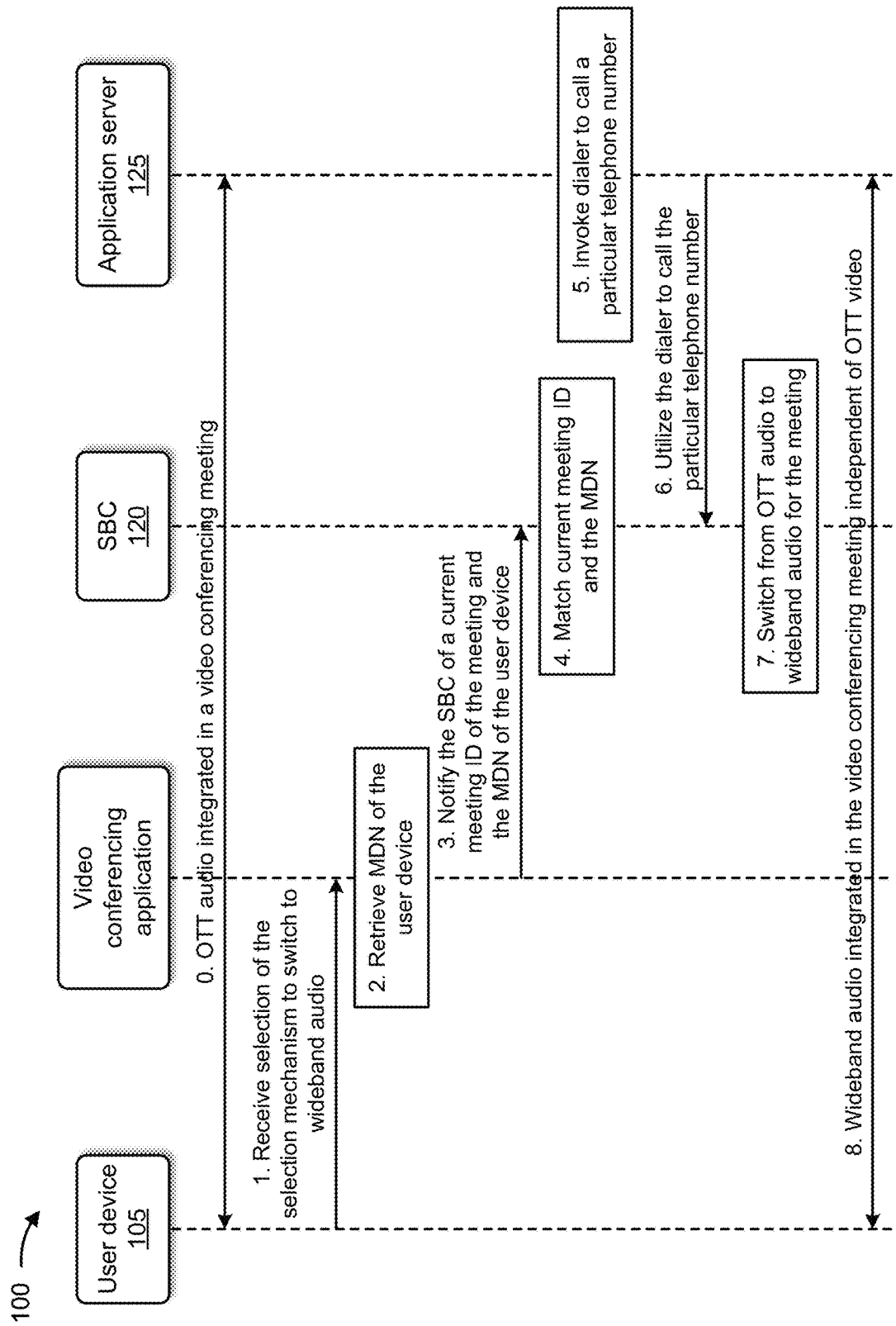

FIG. 1D is another call flow diagram depicting implementations described herein. As shown at step 0 of FIG. 1D, the user device 105 may communicate with the application server 125 to send and/or receive OTT audio (e.g., and OTT video and/or OTT content) integrated in a video conferencing meeting. As shown at step 1, a user of the user device 105 may select a selection mechanism to switch the OTT audio to wideband audio, and the video conferencing application of the user device 105 may receive the selection of the selection mechanism. As shown at step 2, the video conferencing application may retrieve a network identifier (e.g., the MDN) associated with the user device 105.

As shown at step 3 of FIG. 1D, the video conferencing application may notify (e.g., via a notification message provided by the user device 105) the SBC 120 of a current meeting ID of the video conferencing meeting and the network identifier (e.g., the MDN) of the user device 105. The SBC 120 may receive the notification message from the video conferencing application. As shown at step 4, the SBC 120 may match the current meeting ID and the network identifier (e.g., the MDN) of the user device 105 so that the SBC 120 may associate the video conference meeting with the user device 105. As shown at step 5, the application server 125 may invoke a dialer (e.g., a telephone application) of the application server 125 to call a particular telephone number associated with the SBC 120. As shown at step 6, the application server 125 may utilize the dialer to call the particular telephone number, and the SBC 120 may receive the call to the particular telephone number.

As shown at step 7 of FIG. 1D, based on receiving the call, the SBC 120 may switch from the OTT audio to the wideband audio for the video conferencing meeting. As shown at step 8, the user device 105 may communicate with the application server 125 to send and/or receive wideband audio, integrated in the video conferencing meeting, independent of the OTT video and/or the OTT content and without synchronization of the wideband audio, the OTT video, and the OTT content.

Figure 1E:
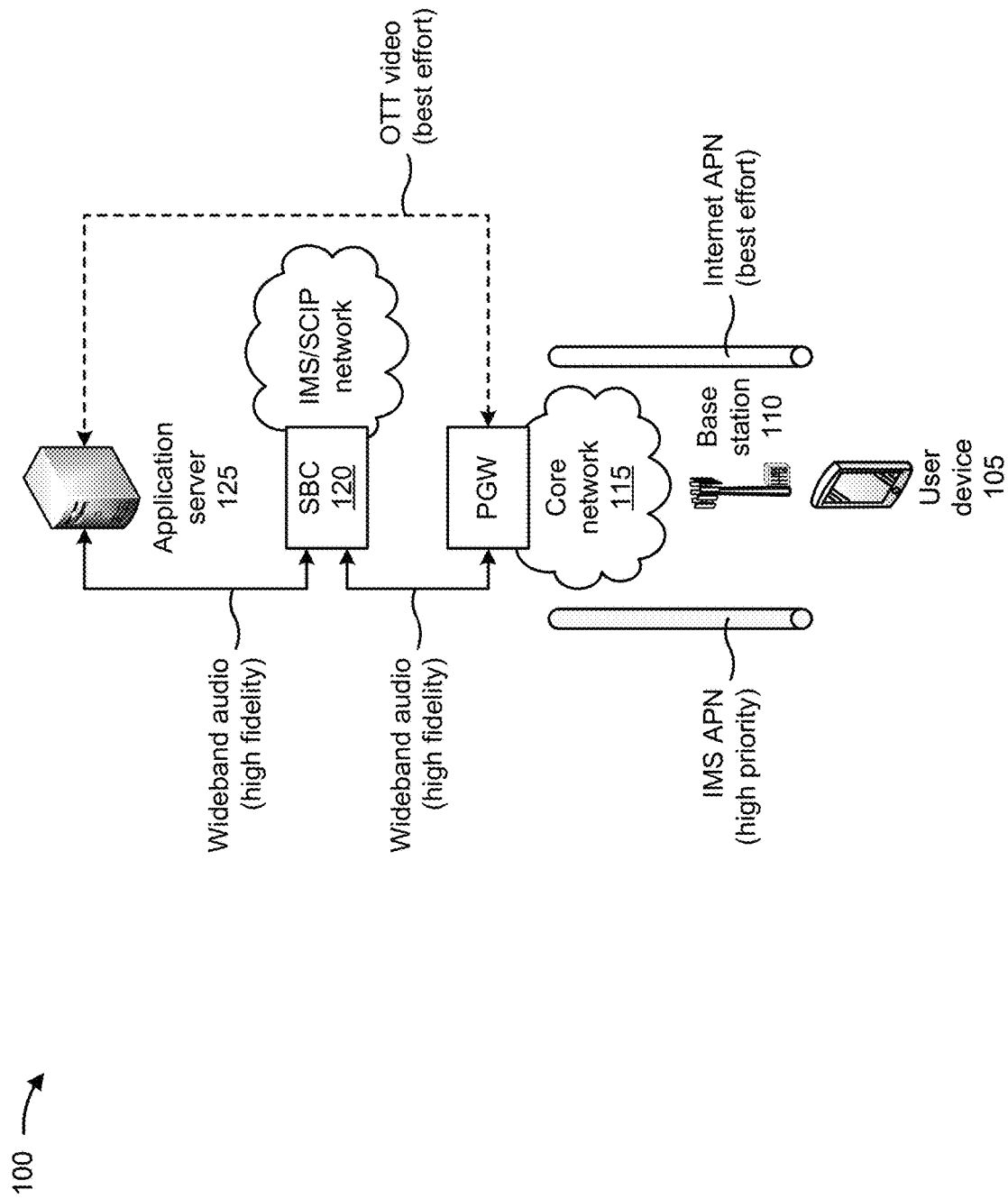

FIG. 1E is a diagram of an example environment 100 in which systems and/or methods, described herein, may be implemented. As shown, the environment may include the user device 105, the base station 110, the core network 115, the IMS/SCIP network, the SBC 120, and the application server 125. As further shown, the user device 105 may establish an IMS access point name (APN) with a packet data network gateway (PGW) of the core network 115, via the base station 110. The IMS APN may enable traffic to be exchanged with a high priority (e.g., a guaranteed quality of service (QoS)) between the user device 105 and the core network 115. The user device 105 may establish an Internet APN with the PGW of the core network 115, via the base station 110. The Internet APN may enable traffic to be exchanged with best efforts (e.g., no guaranteed QoS) between the user device 105 and the core network 115.

As further shown in FIG. 1E, wideband audio with high fidelity may be exchanged between the PGW and the SBC 120, and between the SBC 120 and the application server 125. This may enable the user device 105 and the application server 125 to exchange wideband audio with high fidelity via the IMS APN. OTT video (and/or content) with best efforts may be exchanged between the PGW and the application server. This may enable the user device 105 and the application server 125 to exchange OTT video with best efforts via the Internet APN.

In this way, the SBC 120 enhances audio for a video conferencing application. For example, the SBC 120 may enable a user device 105 to easily switch audio for a video conferencing application from OTT best-effort delivery to wideband, high priority delivery (e.g., VoLTE delivery). The SBC 120 may enable end-to-end wideband encoding/decoding (that encodes or decodes a data stream or signal), which improves audio fidelity (e.g., richer voice data) and eliminates a need for transcoding. Thus, the SBC 120 may conserve computing resources, networking resources, and/or other resources that would otherwise have been consumed by failing to provide quality audio to user devices, resulting in a poor user experience, losing or dropping packets associated with the audio, failing to provide a good user experience for the video and/or the content, handling complaints from users associated with the user devices, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
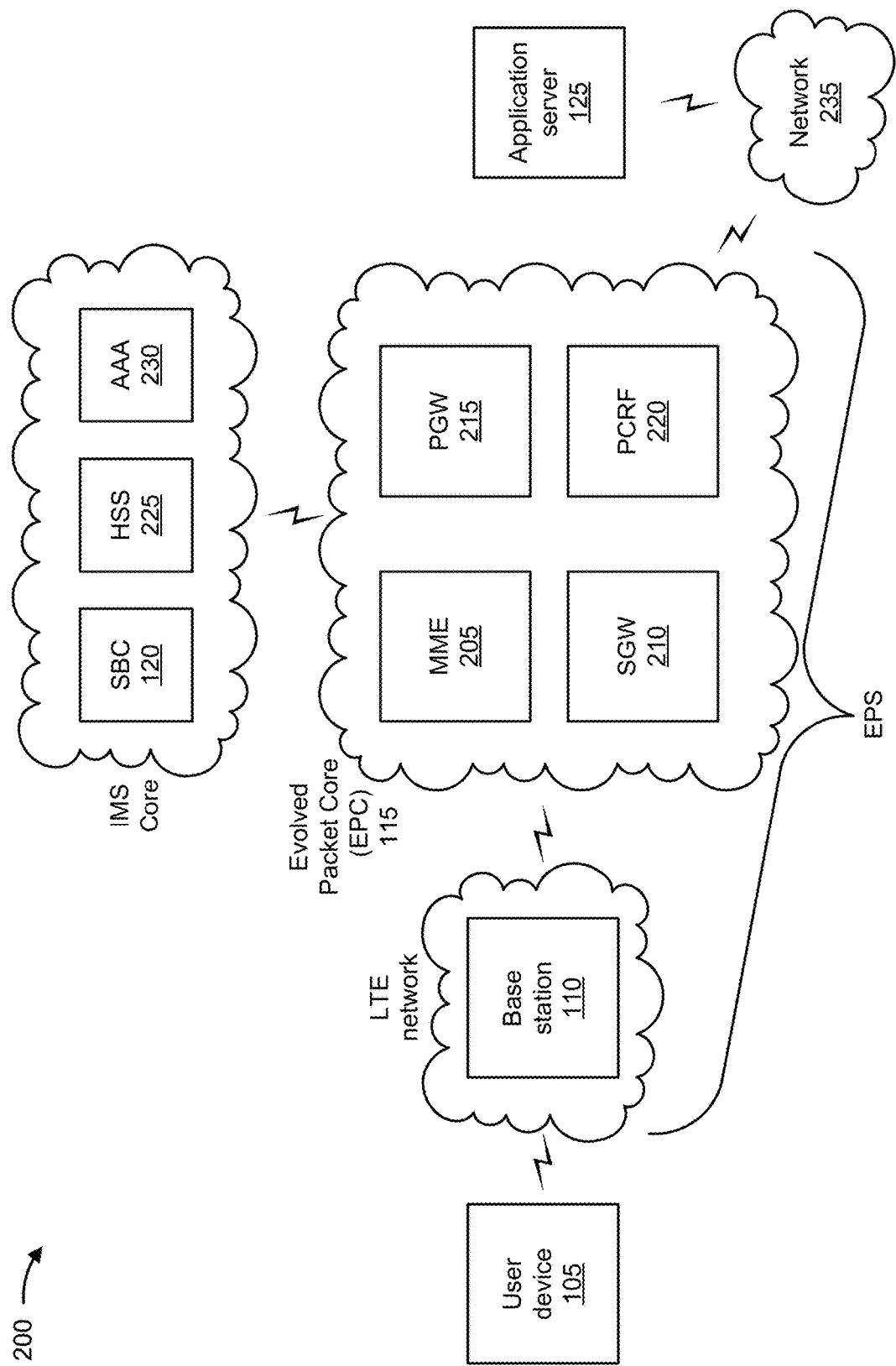
FIG. 2 is a diagram of example environments in which systems and/or methods described herein may be implemented.

FIG. 2 is a diagram of an example environment 200 in which systems and/or methods, described herein, may be implemented. As shown in FIG. 2, environment 200 may include the user device 105, the base station 110, the core network 115, the SBC 120, the application server 125, a mobility management entity device (MME) 205, a serving gateway (SGW) 210, a packet data network gateway (PGW) 215, a policy and charging rules function (PCRF) 220, a home subscriber server (HSS) 225, an authentication, authorization, and accounting server (AAA) 230, and a network 235. Devices of the environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The base station 110 may support, for example, a cellular radio access technology (RAT). The base station 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The base station 110 may transfer traffic between the user device 105 (e.g., using a cellular RAT), one or more base stations (e.g., using a wireless interface or a backhaul interface, such as a wired backhaul interface), and/or the core network 115. The base station 110 may provide one or more cells that cover geographic areas.

In some implementations, the base station 110 may perform scheduling and/or resource management for the user device 105 covered by the base station 110 (e.g., the user device 105 covered by a cell provided by the base station 110). In some implementations, the base station 110 may be controlled or coordinated by a network controller, which may perform load balancing, network-level configuration, and/or other operations. The network controller may communicate with the base station 110 via a wireless or wireline backhaul. In some implementations, the base station 110 may include a network controller, a self-organizing network (SON) module or component, or a similar module or component. In other words, the base station 110 may perform network control, scheduling, and/or network management functions (e.g., for uplink, downlink, and/or sidelink communications of the user device 105 covered by the base station 110).

In some implementations, the terms "base station" (e.g., the base station 110) or "network node" or "network entity" may refer to an aggregated base station, a disaggregated base station, an integrated access and backhaul (IAB) node, a relay node, and/or one or more components thereof. For example, in some implementations, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some implementations, the term "base station," "network node," or "network entity" may refer to one device configured to perform one or more functions, such as those described herein in connection with the base station 110. In some implementations, the terms "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some implementations, the terms "base station," "network node," or "network entity" may refer to one or more virtual base stations and/or one or more virtual base station functions. For example, in some implementations, two or more base station functions may be instantiated on a single device. In some implementations, the terms "base station," "network node," or "network entity" may refer to one of the base station functions and not another. In this way, a single device may include more than one base station.

The SBC 120 may include one or more devices capable of receiving, processing, storing, routing, and/or providing traffic (e.g., a packet and/or other information or metadata) in a manner described herein. For example, the SBC 120 may include a router, such as a label switching router (LSR), a label edge router (LER), an ingress router, an egress router, a provider router (e.g., a provider edge router or a provider core router), a virtual router, or another type of router. Additionally, or alternatively, the SBC 120 may include a gateway, a switch, a firewall, a hub, a bridge, a reverse proxy, a server (e.g., a proxy server, a cloud server, or a data center server), a load balancer, and/or a similar device. In some implementations, the SBC 120 may be a physical device implemented within a housing, such as a chassis. In some implementations, the SBC 120 may be a virtual device implemented by one or more computing devices of a cloud computing environment or a data center. In some implementations, a group of SBCs 120 may be a group of data center nodes that are used to route traffic flow through a network.

The application server 125 may include one or more devices capable of receiving, generating, storing, processing, providing, and/or routing information, as described elsewhere herein. The application server 125 may include a communication device and/or a computing device. For example, the application server 125 may include a server, such as an application server, a client server, a web server, a database server, a host server, a proxy server, a virtual server (e.g., executing on computing hardware), or a server in a cloud computing system. In some implementations, the application server 125 may include computing hardware used in a cloud computing environment.

Some implementations are described herein as being performed within a long-term evolution (LTE) network for explanatory purposes. Some implementations may be performed within a network that is not an LTE network, such as a third generation (3G) network or a fifth generation (5G) network.

The environment 200 may include an evolved packet system (EPS) that includes an LTE network and/or an evolved packet core (EPC) (e.g., the core network 115) that operate based on a third-generation partnership project (3GPP) wireless communication standard. The LTE network may include a radio access network (RAN) that includes one or more base stations 110 that take the form of evolved Node Bs (eNBs) via which the user device 105 communicates with the EPC. The EPC may include the MME 205, the SGW 210, and/or the PGW 215 to enable the user device 105 to communicate with the network 235 and/or an IMS core. The IMS core may include the HSS 225 and/or the AAA 230, and may manage device registration and authentication, session initiation, and/or other operations associated with user devices 105. The HSS 225 and/or the AAA 230 may reside in the EPC and/or the IMS core.

The MME 205 includes one or more devices, such as one or more server devices, capable of managing authentication, activation, deactivation, and/or mobility functions associated with the user device 105. In some implementations, the MME 205 may perform operations relating to authentication of the user device 105. Additionally, or alternatively, the MME 205 may facilitate the selection of a particular SGW 210 and/or a particular PGW 215 to provide traffic to and/or from the user device 105. The MME 205 may perform operations associated with handing off the user device 105 from a first base station 110 to a second base station 110 when user device 105 is transitioning from a first cell associated with the first base station 110 to a second cell associated with the second base station 110. Additionally, or alternatively, the MME 205 may select another MME (not pictured), to which the user device 105 should be handed off (e.g., when the user device 105 moves out of range of the MME 205).

The SGW 210 includes one or more devices capable of routing packets. For example, the SGW 210 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, the SGW 210 may aggregate traffic received from one or more base stations 110 associated with the LTE network, and may send the aggregated traffic to the network 235 (e.g., via the PGW 215) and/or other network devices associated with the EPC and/or the IMS core. The SGW 210 may receive traffic from the network 235 and/or other network devices, and may send the received traffic to the user device 105 via the base station 110. Additionally, or alternatively, the SGW 210 may perform operations associated with handing off the user device 105 to and/or from an LTE network.

The PGW 215 includes one or more devices capable of providing connectivity for the user device 105 to external packet data networks (e.g., other than the depicted EPC and/or the LTE network). For example, the PGW 215 may include one or more data processing and/or traffic transfer devices, such as a gateway, a router, a modem, a switch, a firewall, a MC, a hub, a bridge, a server device, an OADM, or any other type of device that processes and/or transfers traffic. In some implementations, the PGW 215 may aggregate traffic received from one or more SGWs 210, and may send the aggregated traffic to the network 235. Additionally, or alternatively, the PGW 215 may receive traffic from the network 235, and may send the traffic to the user device 105 via the SGW 210 and the base station 110. The PGW 215 may record data usage information (e.g., byte usage), and may provide the data usage information to the AAA 230.

The PCRF 220 includes one or more devices, such as one or more server devices, capable of providing policy control decision and flow-based charging control functionalities. For example, the PCRF 220 may provide network control regarding service data flow detection, gating, and/or quality of service (QoS) and flow-based charging, among other examples. In some implementations, the PCRF 220 may determine how a certain service data flow is to be treated, and may ensure that user plane traffic mapping and treatment is in accordance with a user subscription profile.

The HSS 225 includes one or more devices, such as one or more server devices, capable of managing (e.g., receiving, generating, storing, processing, and/or providing) information associated with the user device 105. For example, the HSS 225 may manage subscription information associated with the user device 105, such as information that identifies a subscriber profile of a user associated with the user device 105, information that identifies services and/or applications that are accessible to the user device 105, location information associated with the user device 105, a network identifier (e.g., a network address) that identifies the user device 105, information that identifies a treatment of the user device 105 (e.g., quality of service information, a quantity of minutes allowed per time period, a quantity of data consumption allowed per time period, etc.), and/or similar information. The HSS 225 may provide this information to one or more other devices of the environment 200 to support the operations performed by those devices.

The AAA 230 includes one or more devices, such as one or more server devices, that perform authentication, authorization, and/or accounting operations for communication sessions associated with the user device 105. For example, the AAA 230 may perform authentication operations for the user device 105 and/or a user of the user device 105 (e.g., using one or more credentials), may control access, by the user device 105, to a service and/or an application (e.g., based on one or more restrictions, such as time-of-day restrictions, location restrictions, single or multiple access restrictions, read/write restrictions, etc.), may track resources consumed by the user device 105 (e.g., a quantity of voice minutes consumed, a quantity of data consumed, etc.), and/or may perform similar operations.

The network 235 includes one or more wired and/or wireless networks. For example, the network 235 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
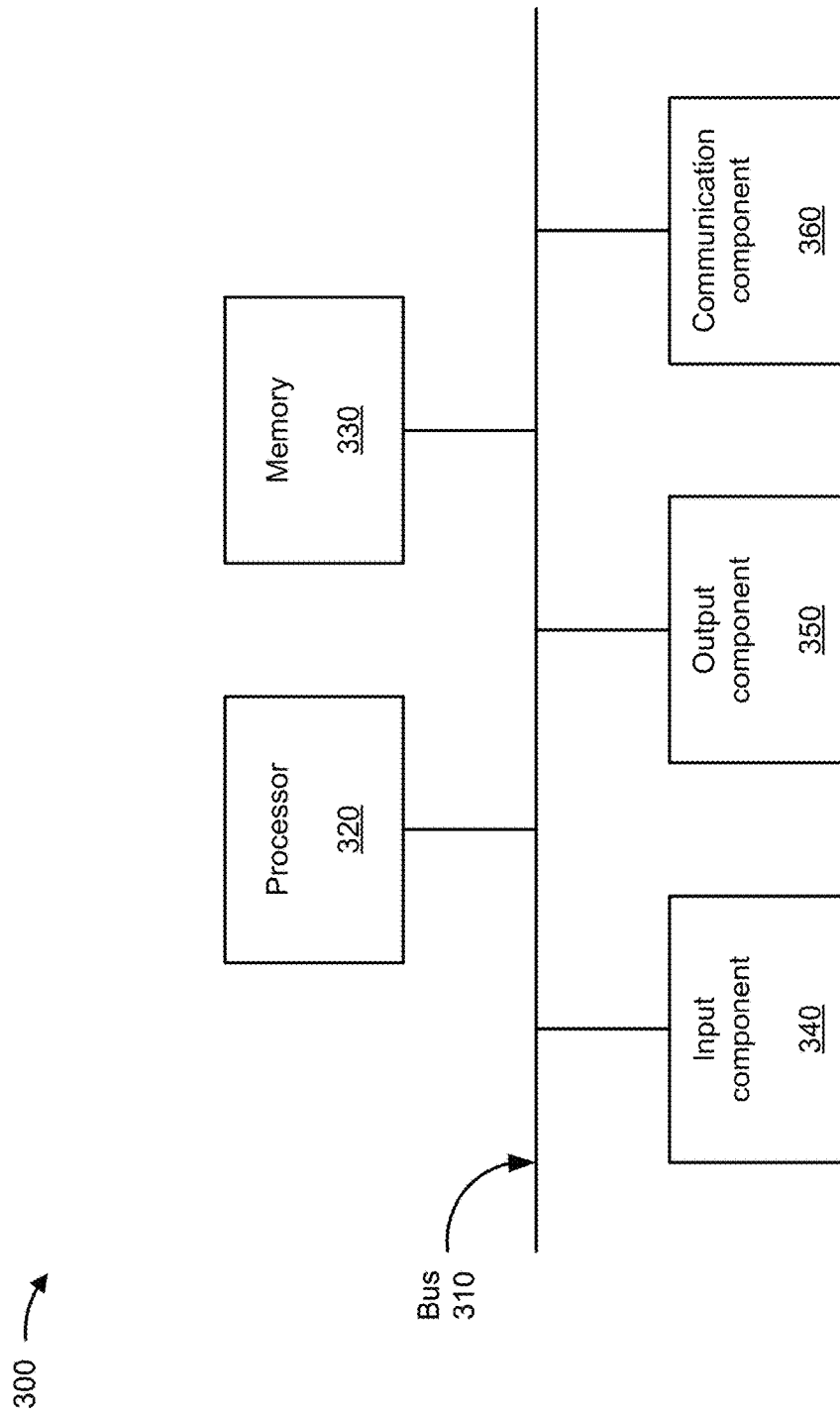
FIG. 3 is a diagram of example components of one or more devices of FIG. 2.

FIG. 3 is a diagram of example components of a device 300, which may correspond to the user device 105, the base station 110, the SBC 120, the application server 125, the MME 205, the SGW 210, the PGW 215, the PCRF 220, the HSS 225, and/or the AAA 230. In some implementations, the user device 105, the base station 110, the SBC 120, the application server 125, the MME 205, the SGW 210, the PGW 215, the PCRF 220, the HSS 225, and/or the AAA 230 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 1, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for enhancing audio for a video conferencing application. In some implementations, one or more process blocks of FIG. 4 may be performed by a network device (e.g., the SBC 120). In some implementations, one or more process blocks of FIG. 4 may be performed by another device or a group of devices separate from or including the network device, such as an application server (e.g., the application server 125). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a request for functionality to switch to wideband audio at a user device receiving OTT video and OTT audio associated with a video conferencing application provided by an application server (block 410). For example, the network device may receive a request for functionality to switch to wideband audio at a user device receiving OTT video and OTT audio associated with a video conferencing application provided by an application server, as described above. In some implementations, the functionality to switch to the wideband audio at the user device causes the user device to display a selection mechanism in the video conferencing application, wherein the selection mechanism enables the functionality when selected. In some implementations, receiving the request for the functionality includes receiving the request for the functionality from the user device. In some implementations, receiving the request for the functionality includes receiving the request for the functionality from the application server. In some implementations, the functionality includes calling a particular telephone number associated with the network device.

In some implementations, the wideband audio includes VoLTE audio. In some implementations, the OTT audio is associated with a QCI of eight or nine, and the wideband audio is associated with a QCI of one or five. In some implementations, the network device is an SBC of an IMS network.

As further shown in FIG. 4, process 400 may include switching from the OTT audio to the wideband audio, for the video conferencing application, based on receiving the request for the functionality (block 420). For example, the network device may switch from the OTT audio to the wideband audio, for the video conferencing application, based on receiving the request for the functionality, as described above. In some implementations, switching from the OTT audio to the wideband audio includes receiving the wideband audio from the application server. In some implementations, switching from the OTT audio to the wideband audio includes switching from the OTT audio to the wideband audio without transcoding the OTT audio. In some implementations, switching from the OTT audio to the wideband audio includes switching an audio path, between the application server and the user device, from an OTT audio path to a wideband audio path.

As further shown in FIG. 4, process 400 may include providing the wideband audio associated with the video conferencing application to the user device to cause the user device to provide the OTT video and the wideband audio independently and without synchronization (block 430). For example, the network device may provide the wideband audio associated with the video conferencing application to the user device to cause the user device to provide the OTT video and the wideband audio independently and without synchronization, as described above.

In some implementations, process 400 includes receiving a notification message indicating a current meeting identifier associated with the video conferencing application and a network identifier of the user device. In some implementations, process 400 includes associating the current meeting identifier and the network identifier to enable the switching from the OTT audio to the wideband audio.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device, a request for functionality to switch to wideband audio at a user device receiving over-the-top (OTT) video and OTT audio associated with a video conferencing application provided by an application server,
   associating, by the network device, a current meeting identifier associated with the video conferencing application and a network identifier of the user device;
   switching, by the network device, from the OTT audio to the wideband audio, for the video conferencing application, based on receiving the request for the functionality and based on associating the current meeting identifier and the network identifier; and
   providing, by the network device, the wideband audio associated with the video conferencing application to the user device to cause the user device to provide the OTT video and the wideband audio independently.

2. The method of claim 1, wherein the functionality to switch to the wideband audio at the user device causes the user device to display a selection mechanism in the video conferencing application,
   wherein the selection mechanism enables the functionality when selected.

3. The method of claim 1, wherein receiving the request for the functionality comprises:
   receiving the request for the functionality from the user device.

4. The method of claim 1, wherein receiving the request for the functionality comprises:
   receiving the request for the functionality from the application server.

5. The method of claim 1, wherein the functionality includes utilizing particular identification information associated with the network device.

6. The method of claim 1, further comprising:
   receiving a notification message indicating the current meeting identifier and the network identifier,
   wherein the user device is configured to provide the OTT video and the wideband audio without synchronization.

7. The method of claim 1, wherein
   associating the current meeting identifier and the network identifier is to enable the switching from the OTT audio to the wideband audio.

8. A non-transitory computer-readable medium storing a set of instructions, the set of instructions comprising:
   one or more instructions that, when executed by one or more processors of a network device, cause the network device to:
   receive a request for functionality to switch to wideband audio at a user device receiving over-the-top (OTT) video and OTT audio associated with a video conferencing application provided by an application server,
      wherein the functionality includes calling a particular telephone number associated with the network device;
   associate a current meeting identifier associated with the video conferencing application and a network identifier of the user device to enable switching from the OTT audio to the wideband audio;
   switch from the OTT audio to the wideband audio, for the video conferencing application, based on receiving the request for the functionality; and
   provide the wideband audio associated with the video conferencing application to the user device to cause the user device to provide the OTT video and the wideband audio independently and without synchronization.

9. The non-transitory computer-readable medium of claim 8, wherein the functionality to switch to the wideband audio at the user device causes the user device to display a selection mechanism in the video conferencing application,
wherein the selection mechanism enables the functionality when selected.

10. The non-transitory computer-readable medium of claim 8, wherein the one or more instructions further cause the network device to:
receive a notification message indicating the current meeting identifier and the network identifier.

11. The non-transitory computer-readable medium of claim 8, wherein the one or more instructions, that cause the network device to switch from the OTT audio to the wideband audio, cause the network device to:
switch from the OTT audio to the wideband audio without transcoding the OTT audio.

12. The non-transitory computer-readable medium of claim 8, wherein the OTT audio is associated with a quality of service class identifier (QCI) of eight or nine, and the wideband audio is associated with a QCI of one or five.

13. The non-transitory computer-readable medium of claim 8, wherein the one or more instructions, that cause the network device to switch from the OTT audio to the wideband audio for the video conferencing application, cause the network device to:
switch an audio path, between the application server and the user device, from an OTT audio path to a wideband audio path.

14. A network device, comprising:
one or more processors configured to:
receive, from one of a user device or an application server, a request for functionality to switch to wideband audio at a user device receiving over-the-top (OTT) video and OTT audio associated with a video conferencing application provided by an application server;
associate a current meeting identifier associated with the video conferencing application and a network identifier of the user device to enable switching from the OTT audio to the wideband audio;
switch from the OTT audio to the wideband audio, for the video conferencing application, based on receiving the request for the functionality; and
provide the wideband audio associated with the video conferencing application to the user device to cause the user device to provide the OTT video and the wideband audio independently.

15. The network device of claim 14, wherein the functionality to switch to the wideband audio at the user device causes the user device to display a selection mechanism in the video conferencing application,
wherein the selection mechanism enables the functionality when selected.

16. The network device of claim 14, wherein the one or more processors are further configured to:
receive a notification message indicating the current meeting identifier and the network identifier.

17. The network device of claim 14, wherein the one or more processors, to switch from the OTT audio to the wideband audio, are configured to:
switch from the OTT audio to the wideband audio without transcoding the OTT audio.

18. The network device of claim 14, wherein the OTT audio is associated with a quality of service class identifier (QCI) of eight or nine, and the wideband audio is associated with a QCI of one or five.

19. The network device of claim 14, wherein the one or more processors, to switch from the OTT audio to the wideband audio, are configured to:
switch an audio path, between the application server and the user device, from an OTT audio path to a wideband audio path.

20. The network device of claim 14, wherein the one or more processors are further configured to:
receive a notification message indicating the current meeting identifier and the network identifier,
wherein the user device is configured to provide the OTT video and the wideband audio without synchronization.

* * * * *